Figures 1, 2:
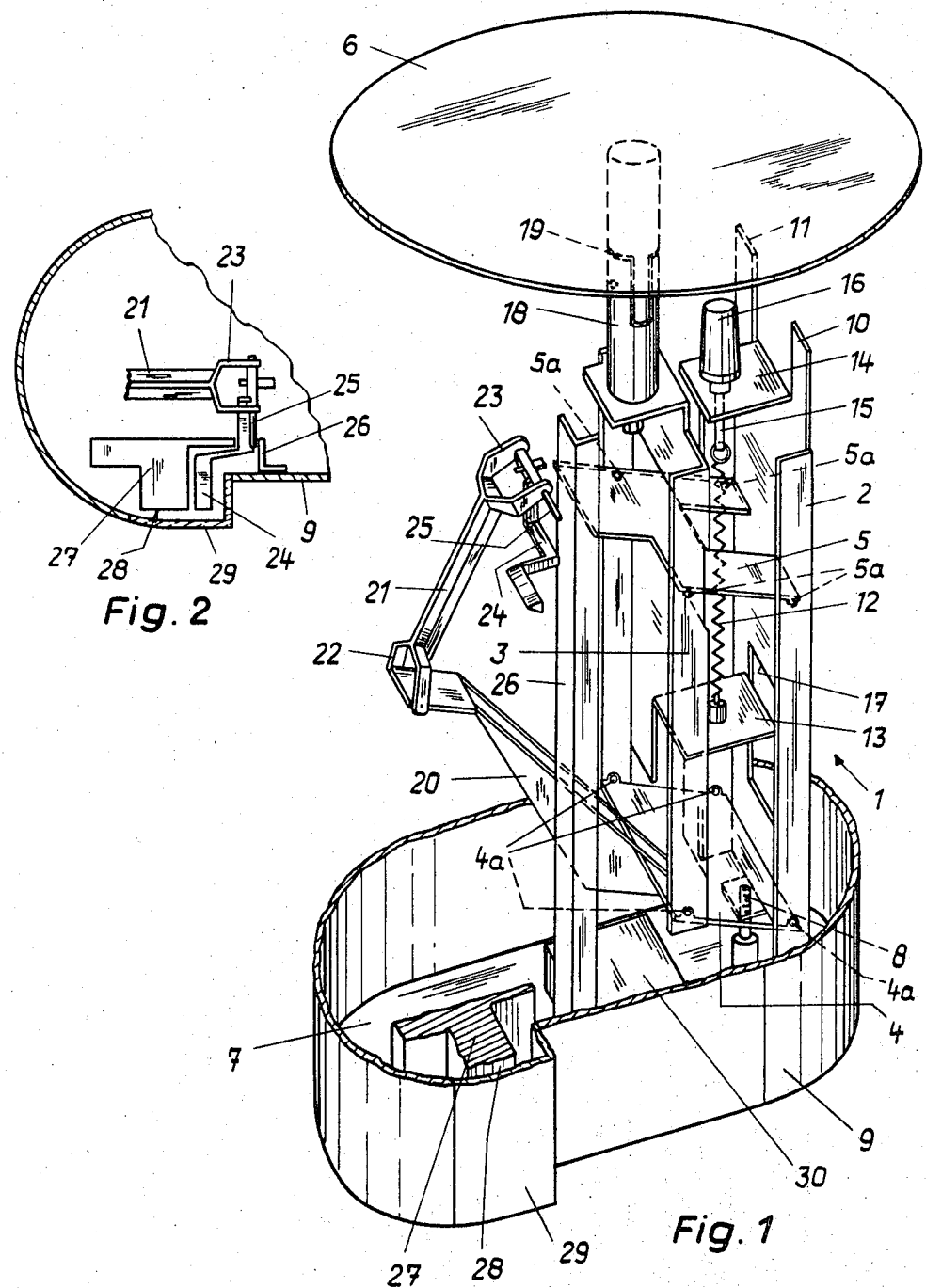

United States Patent
Terraillon

[11] 3,826,320
[45] July 30, 1974

[54] BALANCE

[76] Inventor: Paul Terraillon, 74 Monnetier-Mornex, France

[22] Filed: May 9, 1973

[21] Appl. No.: 358,619

[30] Foreign Application Priority Data
May 15, 1972 Switzerland.............................. 7163

[52] U.S. Cl................................... 177/170, 177/230
[51] Int. Cl....................... G01g 23/14, G01g 23/26
[58] Field of Search.......... 177/168, 169, 170, 229, 177/230

[56] References Cited
UNITED STATES PATENTS

| | | | |
|---|---|---|---|
| 601,273 | 3/1898 | Pelovze.............................. | 177/168 |
| 729,207 | 5/1903 | Mulligan............................ | 177/169 |
| 1,372,707 | 3/1921 | Lorenz............................ | 177/230 X |
| 2,564,361 | 8/1951 | Hanssen............................ | 177/168 |
| 3,584,696 | 6/1971 | Eblowitz......................... | 177/169 X |

Primary Examiner—George H. Miller, Jr.
Attorney, Agent, or Firm—Tab T. Thein

[57] ABSTRACT

A balance, for example a letter scales, comprises an articulated parallelepiped formed by two upright plates pivotally joined by two transverse plates. One of the upright plates is fixed on a base and the other, which is movable against the action of a spring, carries a scale at its upper end. The lower transverse plate has an extension carrying a pivotally mounted arm which in turn pivotally carries an index at a free end thereof. A pair of upright members on the frame define a vertical guide channel for the free end and for the index which cooperates with graduations on one of the members.

4 Claims, 2 Drawing Figures

BALANCE

The invention relates to balances such as letter scales.

In various known balances a weighing device is formed either by two parts moving parallel to one another under the action of a spring, or by an oblique parallelepiped formed of four blades, at least two of which work by flexion. In these balances, the movement of one of the parts is generally transmitted by a rack to a pinion integral with a weight-indicating member. The pinion carrying the indicating member must be fixed on a reinforced base plate supporting the weighing device, which require the provision of a pedestal and reinforcing plates and renders the manufacture of such a balance costly.

An object of the invention is to provide a balance which has neither a rack nor a pinion and which is of a simple and low-cost construction.

According to the invention a balance comprises a frame, two first plates disposed in parallel spaced-apart relation to one another and being joined by two pivotally mounted second plates disposed in parallel spaced-apart relation to one another in a manner to form an articulated parallelepiped, one of said first plates being fixed to the frame, the other of said first plates being movable relative to the frame against the action of a spring, said other plate carrying a weighing scale, one of said second plates having an extension carrying an arm, a free end of which bears against and is guided by at least one guide surface of the frame, and means on said free end for serving as a reference for indicating a weight.

The accompanying drawing show, by way of example, an exemplary embodiment of the balance according to the invention. In the drawing:

FIG. 1 is an overall perspective view of the inventive balance the frame of which has been partly cut away; and FIG. 2 is a partial top plan view showing the end of an arm carrying a reading index of the balance.

The balance shown includes an articulated parallelepiped 1 formed of two upright plates 2 and 3 and two transverse plates 4 and 5. The latter plates are pivotally mounted on the plates 2 and 3 so that the plate 3 which carries a weighing scale 6 may move translationally relative to the plate 2, the lower end of which is fixed by means of a screw 8 to a base plate 7 serving as pedestal for the balance. The plate 7 may be an independent plate supporting a separate housing 9, or may be an integral part of the housing.

The plates 2 and 3 each include a central face or web, facing one another, and a pair of bent-over side flanges. The upper end of the web of plate 2 has two projections 10 and 11 adapted to be fitted in corresponding slots, not shown, of the housing 9. The plates 4 and 5 each have four pivots 4a, 5a which serve as axes for the articulated parallelepiped 1 and which are inserted in corresponding bores in side flanges of the plates 2 and 3, the web of plate 3 being suitably cut away to allow passage of the plates 4 and 5. These pivots 4a, 5a are made integral with lugs of the respective plate 4, 5.

One end of an extension spring 12 is fixed to a bent-over part 13 of the web of plate 3 and the other end to a bent-over part 14 of the web of plate 2 by means of a taring device including a rod 15 connected to the spring 12, the rod 15 passing through a bore of the part 14 and being held by a button 16 screwed on a threaded part of the rod 15.

An aperture 17 is provided in the web of plate 2, this aperture 17 serving as a stop for the part 13 of plate 3 which limits the translational movement of plate 3 and its scale 6. The scale 6 is connected to plate 3 by means of a rod 18 including an articulation 19 enabling the scale 6 to be folded over by 90° so that the balance occupies a reduced volume for storage or packing.

The plate 4 has an extension 20 on which is pivotally mounted an arm 21 by means of a fork 22 at one end thereof. The other, free, end of arm 21 has a fork 23 arranged to pivotally receive an index 24 serving as a reference point for reading the weights. The fork 23 also has a laterally protruding pin 25 which is supported against an upright guide rail 26 fixed to the pedestal 7.

The balance also includes a T-section upright member 27 beside the guide rail 26 and defining therewith a rectilinear guide channel for the index 24, which cooperates with graduations (not shown) on a front face 28 of member 27. A part 29 (FIG. 2) of housing 9, facing the graduations on face 28, is made of a transparent material so as to allow reading of the graduations from outside without difficulty. The balance also include a weight 30 fixed on the pedestal 7 for the purpose of stabilizing the balance.

The described balance operates as follows:

Before carrying out a weighing operation, the balance must be set to zero, or tared, which is effected simply by turning the button 16 which tensions the spring 12 to a greater or lesser degree and consequently enables the index to be brought facing the zero or another chosen reading of the graduations on the face 28 of member 27.

When the balance has been tared or set to zero by means of the button 16, it suffices to place an object to be weighed on scale 6. The weight causes plate 3 to move down against the action of spring 12, and consequent angular displacements of the plate 4, its extension 20 and of the arm 21 carrying the index 24, the index 24 sliding along the guide rail 26 until it stops, facing a graduation indicating the weight of the object.

It can be seen that the end of arm 21 and the index 24 can slide along the channel defined between the rail 26 and the T-section member 27, while being held in this channel. This index 24 can thus in no event move out of the channel, so that the balance is always ready for use.

Preferably, only the plates 2 and 3 and spring 13 are made of metal, and all of the other components of the balance are obtained by "molded," respectively a plastics material. It is also evident that for balances intended to weigh relatively low weights, for example for letter scales, the plates 2 and 3 may also be provided in "molded," respectively plastics material so that the only metallic part of the blanace is the spring 12.

The advantage of such a balance, from the point of view of the manufacturing cost, can be seen immediately. Also, the possibility of providing the balance mainly of plastics materials enables very pleasing aesthetic effects to be obtained; an embodiment has, for example, been provided with an entirely transparent casing, and with the parts forming the frame, the articulated parallelepiped, the reading index, and the weighing scale in different colors.

In the described exemplary embodiment, the index 24 sliding between the rail 26 and member 27 describes a rectilinear path. It is evident to persons skilled in the art that similar guide surfaces could define paths of various shapes, notably a curve. If a circular scale is desired, it is possible without difficulty to provdie guide surfaces lying on an arc of a circle, the center of which would be approximately on the axis about which the plate 4 carrying extension 20 is pivotally mounted on the plate 2. In such an embodiment, an intermediate arm such as 21 would be superfluous and the index could be formed integral with an arm pivotally mounted on the free end of extension 20.

What is claimed is:

1. A balance comprising a frame, two first plates disposed in parallel spaced-apart relation to one another and being joined by two pivotally mounted second plates disposed in parallel spaced-apart relation to one another, in a manner to form an articulated parallelepiped, one of said first plates being fixed to said frame, the other of said first plates being movable relative to said frame against the action of a spring, said other plate carrying a weighing scale, wherein one of said second plates has an extension carrying an arm, the free end of which carries a pivotally mounted reading index which bears against and is guided by at least one rectilinear guide surface of said frame.

2. The balance according to claim 1, comprising a taring device formed of a button screwably mounted on a rod and retaining one end of said spring.

3. The balance according to claim 1, in which said second plates have pivots made integral therewith, said pivots being inserted in corresponding bores of the first plates.

4. The balance according to claim 1, wherein said frame includes a base part, said one of the first plates being fixed upright on said base part, said weighing scale is carried at the upper end of said other of the first plates, said spring opposes downward movement of said other first plate toward said base part, a lower one of said second plates has an extension protruding beyond said other first plate, said arm is pivotally mounted on said extension, and wherein said at least one guide surface is part of at least one guide member which includes means defining an upright rectilinear guide channel for slidably receiving and guiding said free end of the arm and said index, the latter cooperating with graduations carried by said at least one guide member.

* * * * *